Oct. 9, 1923.
F. GAHM
1,470,003
ATTACHING MEANS FOR AUTOMOBILE BUMPERS
Filed Nov. 30, 1921
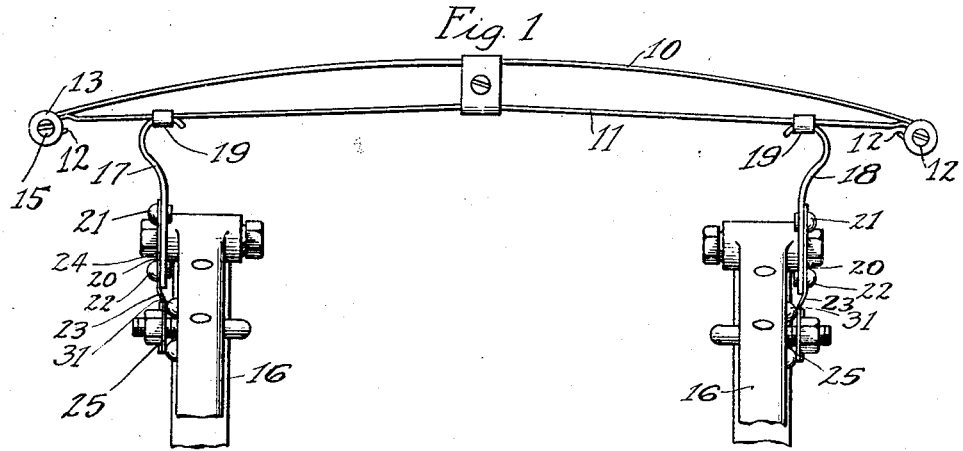
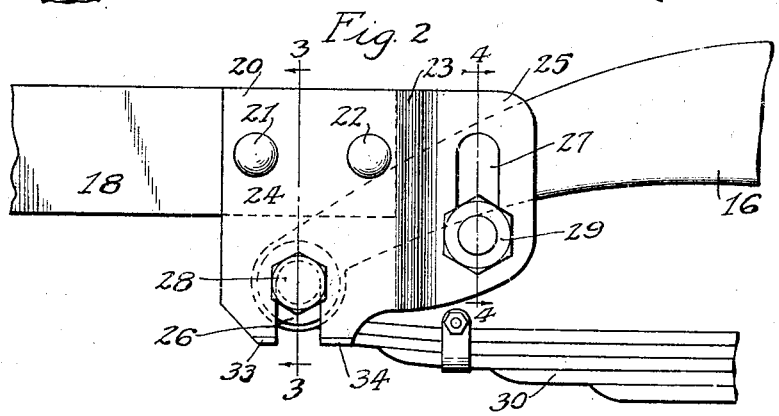
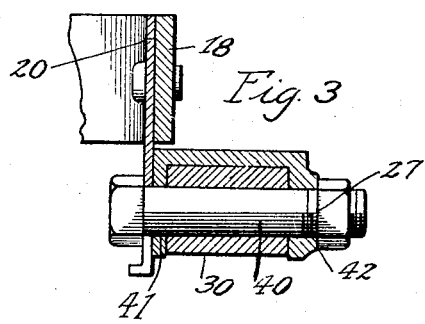
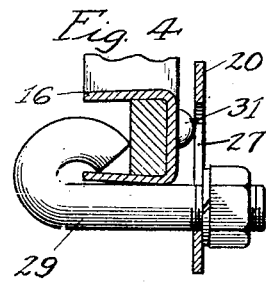
Inventor
Frank Gahm.
By
Attorneys Patented Oct. 9, 1923.

1,470,003

UNITED STATES PATENT OFFICE.

FRANK GAHM, OF STREATOR, ILLINOIS, ASSIGNOR OF ONE-HALF TO WALLACE H. McCORMICK, OF STREATOR, ILLINOIS.

ATTACHING MEANS FOR AUTOMOBILE BUMPERS.

Application filed November 30, 1921. Serial No. 518,900.

*To all whom it may concern:*

Be it known that I, FRANK GAHM, a citizen of the United States, and resident of Streator, county of La Salle, and State of Illinois, have invented certain new and useful Improvements in Attaching Means for Automobile Bumpers, of which the following is a specification, and which are illustrated in the accompanying drawings, forming a part thereof.

The invention relates to bumpers adapted to be secured to the chassis of an automobile for protecting the vehicle against injury in case of collisions.

The object of the present invention is to provide a simple and reliable means for securing the bar to the frame or chassis in such a manner as to permit limited vertical adjustment of the bar, thus adapting it for use with any type of car; a further object being to provide a ready means for rigidly holding the bar in its adjusted position.

A full understanding of the invention may be had by reference to the accompanying drawings, in which—

Fig. 1 is a plan view showing the bumper attached to the frame members of the car;

Fig. 2 is a detail side view showing the means for attaching the bumper to the frame;

Fig. 3 is a detail section on the line 3—3 of Fig. 2; and

Fig. 4 is a detail section on the line 4—4 of Fig. 2.

While the bumper may be of any desired type, the form illustrated is that described in my United States Patent No. 1,390,285, granted September 13, 1921, for improvements in bumpers for automobiles.

As shown, the bumper comprises a pair of flat steel bars 10, 11, of sufficient length to extend across the end of the vehicle. The ends of the two bars are slidingly interlocked, the end portions of the forward bar 10 being folded to form a loop, as shown at 12, the other bar, as 11, projecting into the loop. A pair of caps 13, are applied to the top and bottom of the loop 12, the upper one only being shown and are held in place by means of a screw bolt 15 passing through both of them.

The bumper may be secured to a pair of forwardly directed frame members 16 of the vehicle by means of curved spring arms 17, 18, the forward ends of these arms being shown as extending parallel with and bearing against the inner face of the bar 11, and attached thereto by means of clips 19.

According to the present invention plates 20 are secured to the outer faces of the rear ends of the spring arms 17, 18, as by means of rivets 21, 22, or other suitable securing means. Each plate 20 is bent inwardly, as at 23, its rear portion 25 being offset from the front portion 24 and parallel thereto. Substantially vertical parallel slots 26, 27, having straight sides, are provided in the front and rear portions, respectively, of the plate 20, the front slot 26 extending to the lower edge of the plate and being adapted to engage the bolt 28, which is used for securing the usual vehicle spring 30 to the frame member 16. As shown, the spring 30 terminates in an eye 40, the bolt 28 being passed through this eye and through eyes 41, 42, formed adjacent the end of the member 16.

For securing the rear end of the plate 20 to the frame member 16, a hook bolt 29 is passed through the slot 27, its hooked end engaging the lower flange of the member 16, which is shown as having the usual form of a channel. The bend in the plate 20 brings its rear end into close proximity with the side of the member 16, while the front portion is adapted to fit against the enlargement at the end of the member 16. A pair of rivets 31, 32, on the side of the frame member are adapted to bear against the plate 20 as the hook is tightened, it being therefore unnecessary to employ a washer plate.

It is evident that before the bolts 28 and 29 are tightened the bumper may be vertically adjusted, the two slots 26, 27, permitting limited movement thereof. As soon as the bolt 29 is tightened, however, the bar is held rigid, since there can be no swinging movement about the bolt 29 as a pivot due to the fact that the sides of the slot 26 are straight rather than arcuate. Rotation about the bolt 28 is likewise impossible when that bolt is tightened, due to the shape of the slot 27. Thus, if either bolt is tight the bar will be maintained in its adjusted position.

As an added precaution a pair of outwardly turned lugs 33, 34, may be formed at the lower edge of the plate 20 adjacent the margin of the slot 26. In case both bolts become loose the lugs 33, 34, are adapted to engage the head of the bolt 28.

I claim as my invention—

1. A device for attaching a bumper arm to the frame of a vehicle, comprising a securing plate having therein two parallel slots, the sides of the slots being straight, a pair of securing devices passing through said slots and secured to said frame, and forming the sole support for said bumper arm.

2. A device for securing a bumper to the frame of a vehicle, comprising a vehicle frame member of channel shaped cross-section having an apertured enlarged front portion adapted to receive a shackle bolt, a securing plate having its rear portion offset inwardly from the front portion, both portions having substantially vertical slots therein, the front slot being adapted to engage said shackle bolt, and a hooked bolt passing through the rear slot and engaging said channel bar.

3. In an automobile bumper designed to be mounted upon the channel-shaped side bars of the vehicle, in combination, a bumper bar, supporting arms extending rearwardly therefrom, a pair of securing plates each adapted to be secured to the corresponding supporting arm, the rear portion of said plates being offset inwardly from the front portion thereof, each portion being vertically slotted, the front slot being adapted to receive the shackle bolt of the vehicle side bar, and a hook bolt adapted to pass through said rear slot, its hooked end engaging a flange on said side bar.

4. A device for securing a bumper to the frame of a vehicle, comprising a securing plate having its rear portion offset inwardly from the front portion, both portions being slotted, a longitudinally extending vehicle frame member having eyes adjacent its forward end, said eyes being laterally displaced from the remainder of said frame member and adapted to receive a bolt, rivets having heads extending outwardly from the side of the frame member located slightly in rear of said eyes, a bolt for holding said rear portion of the securing plate against the rivet heads of said frame member.

5. A device for attaching a bumper to the frame of a vehicle, comprising a securing plate having front and rear slots therein, the sides of said slots being straight, the front slot extending to the lower edge of said plate, a pair of outwardly turned lugs at said lower edge adjacent the margins of said front slot, and bolts passing through said slots and secured to said frame.

6. A device for attaching a bumper to the frame of a vehicle, comprising a securing plate having substantially vertical front and rear slots therein, the sides of the slots being straight and parallel, and means passing through said slots and secured to the frame.

7. A device for attaching a bumper to the frame of a vehicle, comprising a securing plate having substantially vertical front and rear slots therein, the sides of said slots being straight and parallel, the front slot extending to the lower edge of said plate and adapted to engage a shackle bolt, and means passing through said rear slot and secured to the frame.

8. A device for attaching a bumper to the frame of a vehicle, comprising a securing plate having front and rear slots therein, the front slot extending to the edge of the plate, an outturned lug at said edge adjacent the margin of said slot, and bolts passing through said slots and secured to the frame.

9. A device for securing a bumper to the frame of a vehicle comprising a securing plate having its rear portion offset inwardly from the front portion, a longitudinally extending vehicle frame member having a laterally bulging front end portion apertured to receive a shackle bolt, rivets having heads extending outwardly from the side of the frame member located slightly in rear of the lateral bulge, and means for holding the rear portion of the securing plate against said rivet heads.

FRANK GAHM.